(12) United States Patent
Tal

(10) Patent No.: US 11,036,602 B1
(45) Date of Patent: Jun. 15, 2021

(54) STORAGE SYSTEM WITH PRIORITIZED RAID REBUILD

(71) Applicant: EMC IP Holding Company LLC, Hopkinton, MA (US)

(72) Inventor: Doron Tal, Haifa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 16/693,858

(22) Filed: Nov. 25, 2019

(51) Int. Cl.
*G06F 11/20* (2006.01)

(52) U.S. Cl.
CPC ...... *G06F 11/2094* (2013.01); *G06F 2201/82* (2013.01)

(58) Field of Classification Search
CPC ............. G06F 11/1076; G06F 11/108; G06F 11/1092; G06F 11/2094
USPC .............................................. 714/6.22, 6.24
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |

(Continued)

FOREIGN PATENT DOCUMENTS

WO 2016111954 A1 7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Chae M Ko
(74) *Attorney, Agent, or Firm* — Ryan, Mason & Lewis, LLP

(57) ABSTRACT

A storage system is configured to establish a redundant array of independent disks (RAID) arrangement comprising a plurality of stripes each having multiple portions distributed across multiple storage devices. The storage system is also configured to detect a failure of at least one of the storage devices, and responsive to the detected failure, to determine for each of two or more remaining ones of the storage devices a number of stripe portions, stored on that storage device, that are part of stripes impacted by the detected failure. The storage system is further configured to prioritize a particular one of the remaining storage devices for rebuilding of its stripe portions that are part of the impacted stripes, based at least in part on the determined numbers of stripe portions. The storage system illustratively balances the rebuilding of the stripe portions of the impacted stripes across the remaining storage devices.

20 Claims, 7 Drawing Sheets

(56) References Cited

U.S. PATENT DOCUMENTS

| | | | |
|---|---|---|---|
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0084600 | A1* | 4/2012 | Kidney ............... G06F 11/1088 714/6.13 |
| 2013/0325824 | A1 | 12/2013 | Shoens |
| 2014/0181016 | A1 | 6/2014 | Whitehead et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0091033 | A1* | 3/2017 | Leggette ................. G06F 8/65 |
| 2017/0192857 | A1 | 7/2017 | Meiri et al. |
| 2019/0012236 | A1* | 1/2019 | Hitron ................. G06F 3/0683 |
| 2019/0146891 | A1* | 5/2019 | Ben Dayan ......... G06F 11/3485 714/4.11 |
| 2019/0303490 | A1 | 10/2019 | Chen et al. |
| 2019/0332478 | A1* | 10/2019 | Gao .................... G06F 11/1092 |

OTHER PUBLICATIONS

EMC Corporation, "Unstoppable Data Reduction: Always-on, In-Line, Zero-Penalty, Enterprise-Class, Free,"https://store.emc.comixtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121, filed in the name of David Meiri et al. on Oct. 25, 2017 and entitled "Opportunistic Compression of Replicated Data in a Content Addressable Storage System."

U.S. Appl. No. 15/662,708, filed in the name of Xiangping Chen et al. on Jul. 28, 2017 and entitled "Token-Based Data Flow Control in a Clustered Storage System."

U.S. Appl. No. 15/824,536, filed in the name of Christopher Sayles et al. on Nov. 28, 2017 and entitled "Storage System with Asynchronous Messaging between Processing Modules for Data Replication."

U.S. Appl. No. 16/037,050, filed in the name of Ying Hu et al. on Jul. 17, 2018 and entitled "Storage System with Multiple Write Journals Supporting Synchronous Replication Failure Recovery."

U.S. Appl. No. 16/253,793, filed in the name of Yuval Harduf et al. on Jan. 22, 2019 and entitled "Storage System with Data Consistency Checking in Synchronous Replication Using Active Snapshot Set."

U.S. Appl. No. 16/396,897, filed in the name of Anton Kucherov et al. on Apr. 29, 2019 and entitled "Storage System with Deduplication-Aware Replication Implemented Using a Standard Storage Command Protocol."

U.S. Appl. No. 16/413,050, filed in the name of Xiangping Chen et al. on May 15, 2019 and entitled "Storage System with Coordinated Recovery across Multiple Input-Output Journals of Different Types."

U.S. Appl. No. 16/265,131, filed in the name of Lior Kamran et al. on Feb. 1, 2019 and entitled "Storage System with Write Cache Release Protection."

U.S. Appl. No. 15/819,666, filed in the name of Xiangping Chen et al. on Nov. 21, 2017 and entitled "Storage System Configured for Controlled Transition between Asynchronous and Synchronous Replication Modes."

U.S. Appl. No. 16/446,138, filed in the name of William F. Moore et al. on Jun. 19, 2019 and entitled "Prefill of Raid Stripes in a Storage System by Reading of Existing Data."

U.S. Appl. No. 16/446,161, filed in the name of William F. Moore et al. on Jun. 19, 2019 and entitled "Automatic Prefill of a Storage System with Conditioning of Raid Stripes."

U.S. Appl. No. 16/446,183, filed in the name of William F. Moore et al. on Jun. 19, 2019 and entitled "Distributed Generation of Random Data in a Storage System."

U.S. Appl. No. 16/166,397, filed in the name of Nimrod Shani et al. on Oct. 22, 2018 and entitled "Storage System with Data Integrity Verification Performed in Conjunction with Internal Data Movement."

U.S. Appl. No. 16/530,121, filed in the name of Anton Kucherov et al. on Aug. 2, 2019 and entitled "Memory-Efficient Processing of Raid Metadata Bitmaps."

* cited by examiner

FIG. 3

|   | 1 | 2 | 3 | 4 | 5 | 6 | 7 | 8 |
|---|---|---|---|---|---|---|---|---|
| 1 | D3 | D2 | B1 | D1 | C2 | C1 | C4 | A1 |
| 2 | Cq | Bq | Dp | B2 | E1 | Dq | A2 | Cp |
| 3 | Ep | C3 | Aq | Eq | B3 | A3 | D4 | E2 |
| 4 | F1 | Fp | E4 | F3 | A4 | B4 | F2 | Fq |
| 5 | G3 | G2 | G1 | Ap | Gp | F4 | Bp | G4 |
| 6 |    |    |    |    |    | E3 | Gq |    |
| Affected members | 3 | 3 | | 4 | 4 | 4 | 4 | 3 |

FIG. 4

| | 1 | 2 | 3 | 4 | 5 | 6 | 7 | 8 |
|---|---|---|---|---|---|---|---|---|
| D | | 1 | | | 1 | | 1 | 1 |
| E | 1 | 1 | | | 1 | 1 | 1 | |
| G | 1 | 1 | | | | 1 | | 1 |
| Total | 3 | 2 | 0 | 2 | 2 | 2 | 2 | 2 |

STORAGE SYSTEM WITH PRIORITIZED RAID REBUILD

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt using parity information, typically in response to a storage device failure or other type of failure within the storage system. For example, a RAID 6 arrangement uses "dual parity" and can recover from simultaneous failure of two storage devices of the storage system. These and other RAID arrangements provide redundancy for stored data, with different types of RAID arrangements providing different levels of redundancy. Storage systems that utilize such RAID arrangements are typically configured to perform a "self-healing" process after detection of a storage device failure, and once the self-healing process is completed, the storage system can sustain additional failures. Conventional techniques of this type can be problematic. For example, such techniques can cause bottlenecks on particular remaining storage devices, which can unduly lengthen the duration of the self-healing process and thereby adversely impact storage system performance.

SUMMARY

Illustrative embodiments provide techniques for prioritized RAID rebuild in a storage system. The prioritized RAID rebuild in some embodiments advantageously enhances storage system resiliency while preserving a balanced rebuild load. Such embodiments can facilitate the self-healing process in a storage system in a manner that avoids bottlenecks and improves storage system performance in the presence of failures. For example, some embodiments can allow the storage system to sustain additional failures even before the self-healing process is fully completed.

In one embodiment, a storage system comprises a plurality of storage devices, and is configured to establish a RAID arrangement comprising a plurality of stripes each having multiple portions distributed across multiple ones of storage devices. The storage system is also configured to detect a failure of at least one of the storage devices, and responsive to the detected failure, to determine for each of two or more remaining ones of the storage devices a number of stripe portions, stored on that storage device, that are part of stripes impacted by the detected failure. The storage system is further configured to prioritize a particular one of the remaining storage devices for rebuilding of its stripe portions that are part of the impacted stripes, based at least in part on the determined numbers of stripe portions.

In some embodiments, determining for one of the remaining storage devices the number of stripe portions, stored on that storage device, that are part of the impacted stripes illustratively comprises determining a number of data blocks stored on that storage device that are part of the impacted stripes, and determining a number of parity blocks stored on that storage device that are part of the impacted stripes. The determined number of data blocks and the determined number of parity blocks are summed to obtain the determined number of stripe portions for that storage device.

The prioritization of a particular one of the remaining storage devices for rebuilding of its stripe portions that are part of the impacted stripes, based at least in part on the determined numbers of stripe portions, illustratively comprises prioritizing a first one of the remaining storage devices having a relatively low determined number of stripe portions for rebuilding of its stripe portions that are part of the impacted stripes, over a second one of the remaining storage devices having a relatively high determined number of stripe portions for rebuilding of its stripe portions that are part of the impacted stripes.

Additionally or alternatively, prioritizing a particular one of the remaining storage devices for rebuilding of its stripe portions that are part of the impacted stripes, based at least in part on the determined numbers of stripe portions, can comprise selecting, for rebuilding of its stripe portions that are part of the impacted stripes, the particular one of the remaining storage devices that has a lowest determined number of stripe portions relative to the determined numbers of stripe portions of the one or more other remaining storage devices.

One or more other additional or alternative criteria can be taken into account in prioritizing a particular one of the remaining storage devices over other ones of the remaining storage devices for rebuilding of its stripe portions that are part of the impacted stripes. In some embodiments, such prioritization is based at least in part on a determination of storage device health, in order to reduce the risk of sustaining a terminal error. For example, a storage device which already exhibits repeating non-terminal errors such as local read errors might be more susceptible to a terminal error, and such health measures can be taken into account in selecting a particular storage device for prioritization.

The storage system in some embodiments illustratively rebuilds, for the particular prioritized one of the remaining storage devices, its stripe portions that are part of the impacted stripes, selects another one of the remaining storage devices for rebuild prioritization, and rebuilds, for the selected other one of the remaining storage devices, its stripe portions that are part of the impacted stripes. These operations of selecting another one of the remaining storage devices for rebuild prioritization and rebuilding, for the selected other one of the remaining storage devices, its stripe portions that are part of the impacted stripes, are illustratively repeated for one or more additional ones of the remaining storage devices, until all of the stripe portions of the impacted stripes are fully rebuilt.

The storage system is further configured in some embodiments to balance the rebuilding of the stripe portions of the impacted stripes across the remaining storage devices. For example, in balancing the rebuilding of the stripe portions of the impacted stripes across the remaining storage devices, the storage system illustratively maintains rebuild work statistics for each of the remaining storage devices over a plurality of iterations of a rebuild process for rebuilding the stripe portions of the impacted stripes, and selects different subsets of the remaining storage devices to participate in respective different iterations of the rebuild process based at least in part on the rebuild work statistics.

In some embodiments, maintaining rebuild work statistics more particularly comprises maintaining a work counter vector that stores counts of respective rebuild work instances for respective ones of the remaining storage devices. A decay factor may be applied to the work counter vector in conjunction with one or more of the iterations.

Additionally or alternatively, in balancing the rebuilding of the stripe portions of the impacted stripes across the remaining storage devices, the storage system is illustratively configured to track amounts of rebuild work performed by respective ones of the remaining storage devices in rebuilding the stripe portions of a first one of the impacted stripes, and excludes at least one of the remaining storage devices from performance of rebuild work for another one of the impacted stripes based at least in part on the tracked amounts of rebuild work for the first impacted stripe.

For example, the excluded remaining storage device for the other one of the impacted stripes may comprise the remaining storage device that performed a largest amount of rebuild work of the amounts of rebuild work performed by respective ones of the remaining storage devices for the first impacted stripe.

The storage system in some embodiments is implemented as a distributed storage system comprising a plurality of storage nodes, each storing data in accordance with a designated RAID arrangement, although it is to be appreciated that a wide variety of other types of storage systems can be used in other embodiments.

These and other illustrative embodiments include, without limitation, apparatus, systems, methods and processor-readable storage media.

BRIEF DESCRIPTION OF THE DRAWINGS

FIG. 3 shows an example RAID arrangement in an illustrative embodiment in the absence of any storage device failure.

FIG. 4 shows the example RAID arrangement of FIG. 3 after a single storage device failure.

FIG. 5 is a table showing the sum of affected members per storage device after the storage device failure illustrated in FIG. 4.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
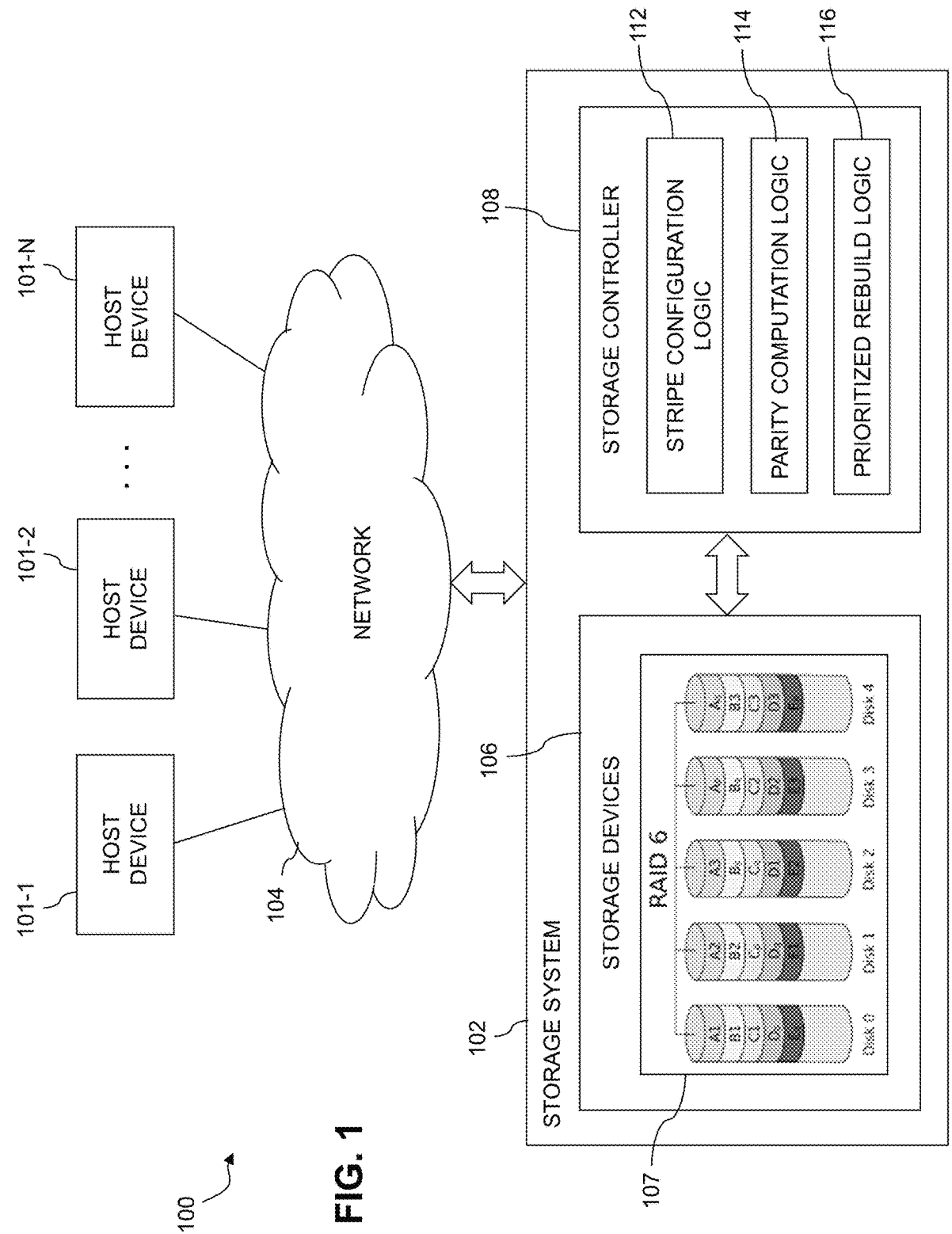
FIG. 1 is a block diagram of an information processing system comprising a storage system incorporating functionality for prioritized RAID rebuild in an illustrative embodiment.

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 configured to store data of a plurality of storage volumes. The storage volumes illustratively comprise respective logical units (LUNs) or other types of logical storage volumes. The term "storage volume" as used herein is intended to be broadly construed, and should not be viewed as being limited to any particular format or configuration.

The storage system 102 in this embodiment stores data across the storage devices 106 in accordance with at least one RAID arrangement 107 involving multiple ones of the storage devices 106. The RAID arrangement 107 in the present embodiment is illustratively a particular RAID 6 arrangement, although it is to be appreciated that a wide variety of additional or alternative RAID arrangements can be used to store data in the storage system 102. The RAID arrangement 107 is established by a storage controller 108 of the storage system 102. The storage devices 106 in the context of the RAID arrangement 107 and other RAID arrangements herein are also referred to as "disks" or "drives." A given such RAID arrangement may also be referred to in some embodiments herein as a "RAID array."

The RAID arrangement 107 in this embodiment illustratively includes an array of five different "disks" denoted Disk 0, Disk 1, Disk 2, Disk 3 and Disk 4, each a different physical storage device of the storage devices 106. Multiple such physical storage devices are typically utilized to store data of a given LUN or other logical storage volume in the storage system 102. For example, data pages or other data blocks of a given LUN or other logical storage volume can be "striped" along with its corresponding parity information across multiple ones of the disks in the RAID arrangement 107 in the manner illustrated in the figure.

A given RAID 6 arrangement defines block-level striping with double distributed parity and provides fault tolerance of up to two drive failures, so that the array continues to operate with up to two failed drives, irrespective of which two drives fail. In the RAID arrangement 107, data blocks A1, A2 and A3 and corresponding p and q parity blocks Ap and Aq are arranged in a row or stripe A as shown. The p and q parity blocks are associated with respective row parity information and diagonal parity information computed using well-known RAID 6 techniques. The data and parity blocks of stripes B, C, D and E in the RAID arrangement 107 are distributed over the disks in a similar manner, collectively providing a diagonal-based configuration for the p and q parity information, so as to support the above-noted double distributed parity and its associated fault tolerance. Numerous other types of RAID implementations can be used, as will be appreciated by those skilled in the art, possibly using error correcting codes in place of parity information. Additional examples of RAID 6 arrangements that may be used in storage system 102 will be described in more detail below in conjunction with the illustrative embodiments of FIGS. 3, 4 and 5.

The storage controller 108 of storage system 102 comprises stripe configuration logic 112, parity computation logic 114, and prioritized rebuild logic 116. The stripe configuration logic 112 determines an appropriate stripe configuration and a distribution of stripe portions across the storage devices 106 for a given RAID arrangement. The parity computation logic 114 performs parity computations of various RAID arrangements, such as p and q parity computations of RAID 6, in a manner to be described in more detail elsewhere herein. The prioritized rebuild logic 116 is configured to control the performance of a prioritized RAID rebuild process in the storage system 102, such as the process illustrated in FIG. 2.

Additional details regarding examples of techniques for storing data in RAID arrays such as the RAID arrangement 107 of the FIG. 1 embodiment are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, HDDs can be used in combination with or in place of SSDs or other types of NVM devices in the storage system 102.

It is therefore to be appreciated numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating 10 operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell EMC. Other types of MPIO drivers from other driver vendors may be used.

The storage system 102 in this embodiment implements functionality for prioritized RAID rebuild. This illustratively includes the performance of a process for prioritized RAID rebuild in the storage system 102, such as the example process to be described below in conjunction with FIG. 2. References herein to "prioritized RAID rebuild" are intended to be broadly construed, so as to encompass various types of RAID rebuild processes in which rebuilding of impacted stripe portions on one storage device is prioritized over rebuilding of impacted stripe portions on one or more other storage devices.

The prioritized RAID rebuild in some embodiments is part of what is also referred to herein as a "self-healing process" of the storage system 102, in which redundancy in the form of parity information, such as row and diagonal parity information, is utilized in rebuilding stripe portions of one or more RAID stripes that are impacted by a storage device failure.

In operation, the storage controller 108 via its stripe configuration logic 112 establishes a RAID arrangement comprising a plurality of stripes each having multiple portions distributed across multiple ones of the storage devices 106. Examples include the RAID arrangement 107, and the additional RAID 6 arrangement to be described below in conjunction with FIGS. 3, 4 and 5. As mentioned previously, a given such RAID 6 arrangement provides redundancy that supports recovery from failure of up to two of the storage devices 106. Other types of RAID arrangements can be used, including other RAID arrangements each supporting at least one recovery option for reconstructing data blocks of at least one of the storage devices 106 responsive to a failure of that storage device.

The stripe portions of each of the stripes illustratively comprise a plurality of data blocks and one or more parity blocks. For example, as indicated previously, stripe A of the RAID arrangement 107 includes data blocks A1, A2 and A3 and corresponding p and q parity blocks Ap and Aq arranged in a row as shown. In other embodiments, the data and parity blocks of a given RAID 6 stripe are distributed over the storage devices in a different manner, other than in a single row as shown in FIG. 1, in order to avoid processing bottlenecks that might otherwise arise in storage system 102. The data and parity blocks are also referred to herein as "chunklets" of a RAID stripe, and such blocks or chunklets are examples of what are more generally referred to herein as "stripe portions." The parity blocks or parity chunklets illustratively comprise row parity or p parity blocks and q parity or diagonal parity blocks, and are generated by parity computation logic 114 using well-known RAID 6 techniques.

The storage system 102 is further configured to detect a failure of at least one of the storage devices 106. Such a failure illustratively comprises a full or partial failure of one or more of the storage devices 106 in a RAID group of the RAID arrangement 107, and can be detected by the storage controller 108. The term "RAID group" as used herein is intended to be broadly construed, so as to encompass, for example, a set of storage devices that are part of a given RAID arrangement, such as at least a subset of the storage devices 106 that are part of the RAID arrangement 107. A given such RAID group comprises a plurality of stripes, each containing multiple stripe portions distributed over multiple ones of the storage devices 106 that are part of the RAID group.

Responsive to the detected failure, the storage system 102 determines, for each of two or more remaining ones of the storage devices 106 of the RAID group, a number of stripe portions, stored on that storage device, that are part of stripes impacted by the detected failure, and prioritizes a particular one of the remaining storage devices 106 of the RAID group for rebuilding of its stripe portions that are part of the impacted stripes, based at least in part on the determined numbers of stripe portions. The impacted stripes are also referred to herein as "degraded stripes," and represent those stripes of the RAID group that each have at least one stripe portion that is stored on a failed storage device. The "remaining ones" of the storage devices 106 are those storage devices that have not failed, and are also referred to herein as "surviving storage devices" in the context of a given detected failure.

This prioritization approach in some embodiments can significantly improve a self-healing process of the storage system 102 by intelligently prioritizing the rebuilding of stripe portions for certain remaining storage devices over other remaining storage devices. For example, such prioritization can allow the storage system 102 to sustain one or more additional failures even before the self-healing process is completed. More particularly, in a RAID 6 arrangement, the disclosed techniques can allow the storage system 102 in some circumstances to sustain an additional storage device failure that might otherwise have led to data loss, by prioritizing the rebuild for a selected remaining storage device. After the rebuild is completed for the selected remaining storage device, other ones of the remaining storage devices can be similarly selected by the storage system 102 for prioritized rebuild, until all of the stripes impacted by the detected failure are fully recovered.

The determination of numbers of stripe portions and the associated prioritization of a particular storage device for rebuild are illustratively performed by or under the control of the prioritized rebuild logic 116 of the storage controller 108. It should be noted that the term "determining a number of stripe portions" as used herein is intended to be broadly construed, so as to encompass various arrangements for obtaining such information in conjunction with a detected failure. For example, the determining may involve computing the number of stripe portions for each of the remaining storage devices responsive to the detected failure. Alternatively, the determining may involve obtaining a previously-computed number of stripe portions, where the computation was performed, illustratively by the prioritized rebuild logic 116, prior to the detected failure. Such pre-computed information can be stored in a look-up table or other type of data structure within a memory that is within or otherwise accessible to the storage controller 108. Accordingly, the numbers of stripe portions on remaining ones of the storage devices 106 that are impacted by a failure of one or more of the storage devices 106 can be precomputed and stored in the storage system 102, possibly in conjunction with configuration of the RAID 6 stripes by stripe configuration logic 112 and/or computation of the row and diagonal parity information by the parity computation logic 114.

In some embodiments, determining for one of the remaining storage devices 106 the number of stripe portions, stored on that storage device, that are part of the impacted stripes illustratively comprises determining a number of data blocks stored on that storage device that are part of the impacted stripes, determining a number of parity blocks stored on that storage device that are part of the impacted stripes, and summing the determined number of data blocks and the determined number of parity blocks to obtain the determined number of stripe portions for that storage device.

The prioritization of a particular one of the remaining storage devices 106 for rebuilding of its stripe portions that are part of the impacted stripes, based at least in part on the determined numbers of stripe portions, comprises, for example, prioritizing a first one of the remaining storage devices 106 having a relatively low determined number of stripe portions for rebuilding of its stripe portions that are part of the impacted stripes, over a second one of the remaining storage devices 106 having a relatively high determined number of stripe portions for rebuilding of its stripe portions that are part of the impacted stripes.

Additionally or alternatively, prioritizing a particular one of the remaining storage devices 106 for rebuilding of its stripe portions that are part of the impacted stripes, based at least in part on the determined numbers of stripe portions, can comprise selecting, for rebuilding of its stripe portions that are part of the impacted stripes, the particular one of the remaining storage devices 106 that has a lowest determined number of stripe portions relative to the determined numbers of stripe portions of the one or more other remaining storage devices 106.

One or more other additional or alternative criteria can be taken into account in prioritizing a particular one of the remaining storage devices 106 over other ones of the remaining storage devices for rebuilding of its stripe portions that are part of the impacted stripes. In some embodiments, such prioritization is based at least in part on a determination of storage device health, in order to reduce the risk of sustaining a terminal error. For example, a storage device which already exhibits repeating non-terminal errors such as local read errors might be more susceptible to a terminal error, and such health measures can be taken into account in selecting a particular storage device for prioritization.

The storage system 102 illustratively rebuilds, for the particular prioritized one of the remaining storage devices 106, its stripe portions that are part of the impacted stripes, selects another one of the remaining storage devices 106 for rebuild prioritization, and rebuilds, for the selected other one of the remaining storage devices 106, its stripe portions that are part of the impacted stripes. These operations of selecting another one of the remaining storage devices 106 for rebuild prioritization and rebuilding, for the selected other one of the remaining storage devices 106, its stripe portions that are part of the impacted stripes, are illustratively repeated for one or more additional ones of the remaining storage devices 106, until all of the stripe portions of the impacted stripes are fully rebuilt.

The storage system 102 is further configured in some embodiments to balance the rebuilding of the stripe portions of the impacted stripes across the remaining storage devices 106. For example, in balancing the rebuilding of the stripe portions of the impacted stripes across the remaining storage devices 106, the storage system 102 illustratively maintains rebuild work statistics for each of the remaining storage devices 106 over a plurality of iterations of a rebuild process for rebuilding the stripe portions of the impacted stripes, and selects different subsets of the remaining storage devices 106 to participate in respective different iterations of the rebuild process based at least in part on the rebuild work statistics.

In some embodiments, maintaining rebuild work statistics more particularly comprises maintaining a work counter vector that stores counts of respective rebuild work instances for respective ones of the remaining storage devices 106. A decay factor may be applied to the work counter vector in conjunction with one or more of the iterations. More detailed examples of a work counter vector and associated decay factor are provided elsewhere herein.

In balancing the rebuilding of the stripe portions of the impacted stripes across the remaining storage devices 106, the storage system 102 in some embodiments tracks amounts of rebuild work performed by respective ones of the remaining storage devices 106 in rebuilding the stripe portions of a first one of the impacted stripes, and excludes at least one of the remaining storage devices 106 from performance of rebuild work for another one of the impacted stripes based at least in part on the tracked amounts of rebuild work for the first impacted stripe. For example, the excluded remaining storage device for the other one of the impacted stripes may comprise the remaining storage device that performed a largest amount of rebuild work of the amounts of rebuild work performed by respective ones of the remaining storage devices 106 for the first impacted stripe.

As indicated previously, the above-described functionality relating to prioritized RAID rebuild in the storage system 102 are illustrative performed at least in part by the storage controller 108, utilizing its logic instances 112, 114 and 116.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, RAID arrangement 107, storage controller 108, stripe configuration logic 112, parity computation logic 114, and prioritized rebuild logic 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which implements a process for prioritized RAID rebuild in the storage system 102. The process illustratively comprises an algorithm implemented at least in part by the storage controller 108 and its logic instances 112, 114 and 116. As noted above, the storage devices 106 in some embodiments are more particularly referred to as "drives" and may comprise, for example, SSDs, HDDs, hybrid drives or other types of drives. A set of storage devices over which a given RAID arrangement is implemented illustratively comprises what is generally referred to herein as a RAID group.

Figure 2:
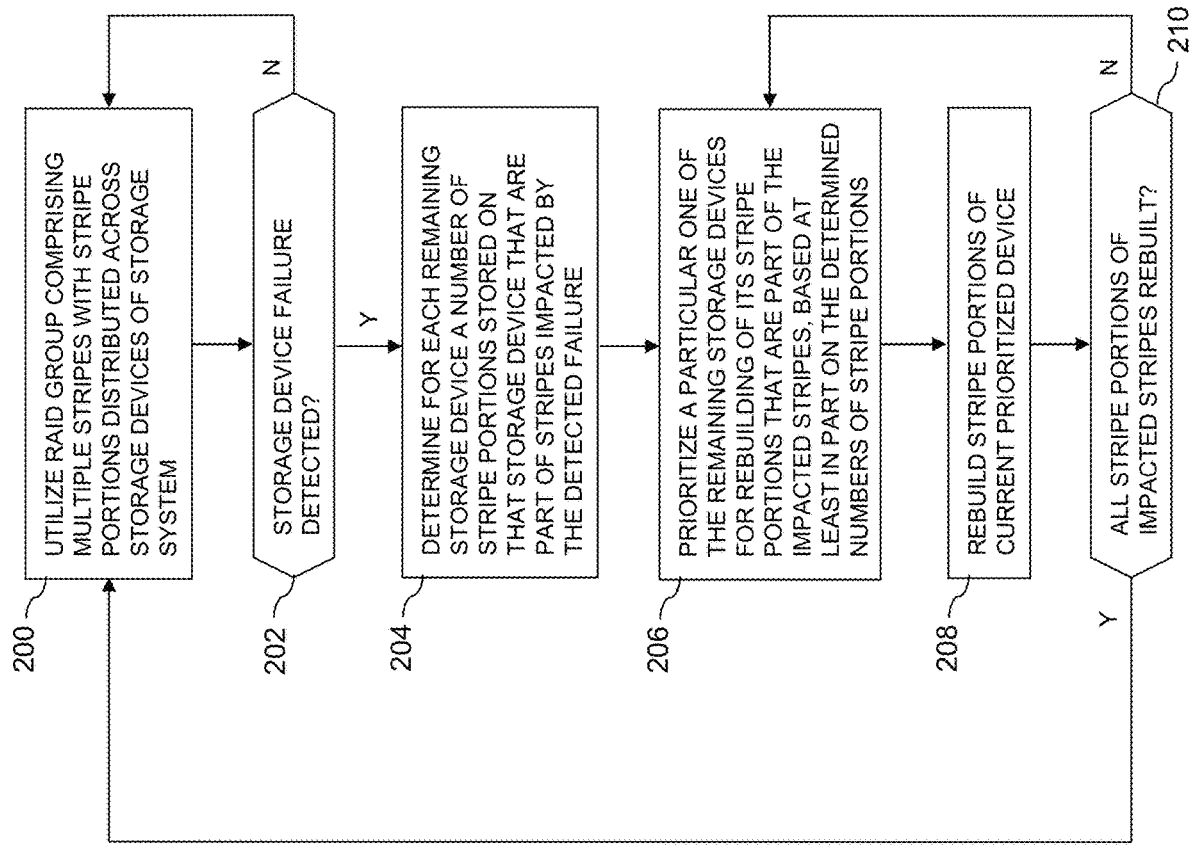
FIG. 2 is a flow diagram of a prioritized RAID rebuild process in an illustrative embodiment.

The process as illustrated in FIG. 2 includes steps 200 through 210, and is described in the context of storage system 102 but is more generally applicable to a wide variety of other types of storage systems each comprising a plurality of storage devices. The process is illustratively performed under the control of the prioritized rebuild logic 116, utilizing stripe configuration logic 112 and parity computation logic 114. Thus, the FIG. 2 process can be viewed as an example of an algorithm collectively performed by the logic instances 112, 114 and 116. Other examples of such algorithms implemented by a storage controller or other storage system components will be described elsewhere herein.

In step 200, the storage system 102 utilizes a RAID group comprising multiple stripes with stripe portions distributed across at least a subset of the storage devices 106 of the storage system 102. As part of this utilization, data blocks are written to and read from corresponding storage locations in the storage devices of the RAID group, responsive to write and read operations received from the host devices 101. The RAID group is configured utilizing stripe configuration logic 112 of the storage controller 108.

In step 202, a determination is made as to whether or not a failure of at least one of the storage devices of the RAID group has been detected within the storage system 102. If at least one storage device failure has been detected, the process moves to step 204, and otherwise returns to step 200 to continue to utilize the RAID group in the normal manner. The term "storage device failure" as used herein is intended to be broadly construed, so as to encompass a complete failure of the storage device, or a partial failure of the storage device. Accordingly, a given failure detection in step 202 can involve detection of full or partial failure of each of one or more storage devices.

In step 204, the storage system 102 determines for each remaining storage device a number of stripe portions stored on that storage device that are part of stripes impacted by the detected failure. A "remaining storage device" as that term is broadly used herein refers to a storage device that is not currently experiencing a failure. Thus, all of the storage devices of the RAID group other than the one or more storage devices for which a failure was detected in step 202 are considered remaining storage devices of the RAID group. Such remaining storage devices are also referred to herein as "surviving storage devices," as these storage devices have survived the one or more failures detected in step 202. A more particular example of the determination of step 204 will be described below in conjunction with FIGS. 3, 4 and 5.

In step 206, the storage system 102 prioritizes a particular one of the remaining storage devices for rebuilding of its stripe portions that are part of the impacted stripes, based at least in part on the determined numbers of stripe portions. As indicated previously, additional or alternative criteria can be taken into account in illustrative embodiments in prioritizing a particular one of the remaining storage devices over other ones of the remaining storage devices for rebuilding of its stripe portions that are part of the impacted stripes. These additional or alternative criteria can include measures of storage device health, such as whether or not a given storage device has previously exhibited local read errors or other types of non-terminal errors, for example, prior to a previous rebuild. As a given storage device that has previously exhibited such errors may be more likely to fail in the future than other ones of the remaining storage devices that have not previously exhibited such errors, the prioritization can be configured to select a different one of the storage devices. Other types of storage device health measures can be similarly used in determining an appropriate prioritization.

In step 208, the storage system 102 rebuilds the stripe portions of the current prioritized storage device. Such rebuilding of the stripe portions illustratively involves reconstruction of impacted data blocks and parity blocks using non-impacted data blocks and parity blocks, using well-known techniques.

In step 210, a determination is made as to whether or not all of the stripe portions of the impacted stripes of the RAID group have been rebuilt. If all of the stripe portions of the impacted stripes have been rebuilt, the process returns to step 200 in order to continue utilizing the RAID group. Otherwise, the process returns to step 206 as shown in order to select another one of the remaining storage devices as a current prioritized device, again based at least in part on the determined numbers of stripe portions, and then moves to step 208 to rebuild the stripe portions of the current prioritized device. This repetition of steps 206, 208 and 210 continues for one or more iterations, until it is determined in step 210 that all of the stripe portions of the impacted stripes have been rebuilt, at which point the iterations end and the process returns to step 200 as previously indicated.

Different instances of the process of FIG. 2 can be performed for different portions of the storage system 102, such as different storage nodes of a distributed implementation of the storage system 102. The steps are shown in sequential order for clarity and simplicity of illustration only, and certain steps can at least partially overlap with other steps.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for prioritized RAID rebuild in a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different prioritized RAID rebuild processes for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in storage system 102 that is configured to perform the steps of the FIG. 2 process can be implemented as part of what is more generally referred to herein as a processing platform comprising one or more processing devices each comprising a processor coupled to a memory.

A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms. For example, respective distributed modules of storage controller 108 can be implemented in respective containers running on respective ones of the processing devices of a processing platform.

Accordingly, the storage controller 108 is configured to support functionality for prioritized RAID rebuild of the type previously described in conjunction with FIGS. 1 and 2. For example, the logic instances 112, 114 and 116 of storage controller 108 are collectively configured to perform a process such as that shown in FIG. 2, in order to achieve prioritized RAID rebuild in the storage system 102.

Additional illustrative embodiments will now be described with reference to FIGS. 3, 4 and 5. In these embodiments, the storage system 102 utilizes a different RAID 6 arrangement than the RAID arrangement 107 to distribute data and parity blocks across the storage devices 106 of the storage system 102. The RAID 6 arrangement supports recovery from failure of up to two of the storage devices of the RAID group, although other RAID arrangements can be used in other embodiments.

Such a RAID group in some embodiments is established for a particular one of the storage nodes of a distributed implementation of storage system 102. The storage devices associated with the particular one of the storage nodes are illustratively part of a DAE of that storage node, although other storage device arrangements are possible. Each such storage device illustratively comprises an SSD, HDD or other type of storage drive. Similar arrangements can be implemented for each of one or more other ones of the storage nodes. Again, distributed implementations using multiple storage nodes are not required.

The RAID 6 arrangement is an example of a RAID arrangement providing resiliency for at least two concurrent storage device failures, also referred to as a "dual parity" arrangement. Such arrangements generally implement RAID stripes each comprising n+k stripe portions, where n is the number of data blocks of the stripe, and k is the number of parity blocks of the stripe. These stripe portions are distributed across a number of storage devices which is the same as or larger than n+k. More particularly, the embodiments to be described below utilize a RAID 6 arrangement that implements n+2 dual parity, such that the RAID group can continue to operate with up to two failed storage devices, irrespective of which two storage devices fail. Such a RAID 6 arrangement can utilize any of a number of different techniques for generating the parity blocks. Such parity blocks are computed using parity computation logic 114 of storage system 102. It is also possibly to use error correction codes such as Reed Solomon codes, as well as other types of codes that are known to those skilled in the art.

As will be described in more detail below, the storage system 102 illustratively distributes the RAID stripes across the storage devices 106 in a manner that facilitates the balancing of rebuild work over the surviving storage devices in the event of a storage device failure, thereby allowing the rebuild process to avoid bottlenecks and complete more quickly than would otherwise be possible, while also allowing additional failures to be handled more quickly and efficiently. It should also be appreciated, however, that there are numerous other ways to distribute data blocks and parity blocks in a RAID array.

Figure 3:
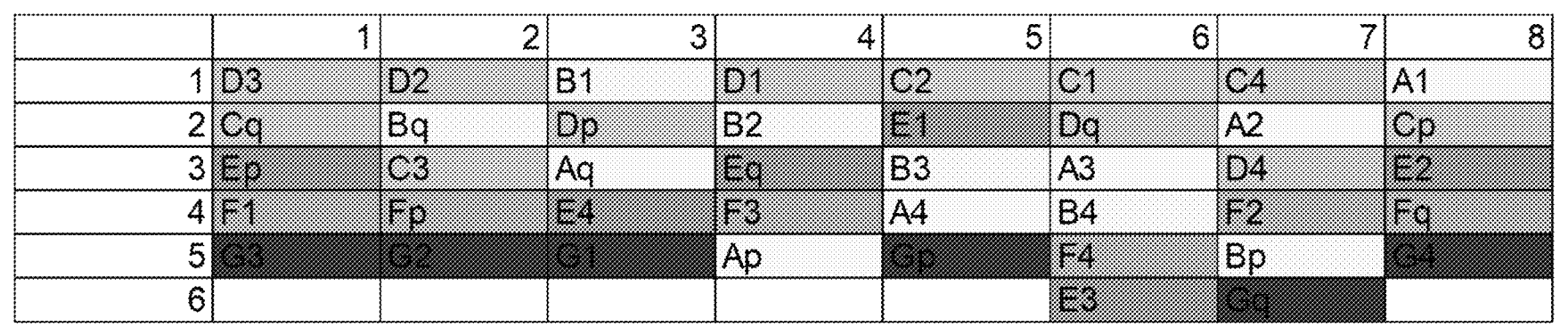

Referring now to FIG. 3, an example RAID 6 arrangement is shown in the absence of any storage device failure. More particularly, FIG. 3 shows an example RAID 6 arrangement in a "healthy" storage system prior to a first storage device failure. The table in the figure illustrates a RAID 6 arrangement with eight storage devices corresponding to respective columns 1 to 8 of the table. In this embodiment, n=4 and k=2, and the total number of storage devices is therefore greater than n+k. The storage devices are also referred to as Storage Device 1 through Storage Device 8. Each of the storage devices is assumed to have a capacity of at least seven stripe chunklets, corresponding to respective rows of the table, although only rows 1 through 6 are shown in the figure. Each of the stripe chunklets denotes a particular portion of its corresponding stripe, with that portion being stored within a block of contiguous space on a particular storage device, also referred to herein as an "extent" of that storage device. The stripe chunklets of each stripe more particularly include data chunklets and parity chunklets. As indicated previously, such chunklets are more generally referred to herein as "blocks" or still more generally as "stripe portions."

The RAID 6 arrangement in this example has seven stripes, denoted as stripes A through G respectively. Each stripe has four data chunklets denoted by the numerals 1-4 and two parity chunklets denoted as p and q. Thus, for example, stripe A has four data chunklets A1, A2, A3 and A4 and two parity chunklets Ap and Aq. Similarly, stripe B has four data chunklets B1, B2, B3 and B4 and two parity chunklets Bp and Bq, stripe C has four data chunklets C1, C2, C3 and C4 and two parity chunklets Cp and Cq, and so on for the other stripes D, E and F of the example RAID 6 arrangement. This results in a total of 42 chunklets in the seven stripes of the RAID 6 arrangement. These chunklets are distributed across the eight storage devices in the manner illustrated in FIG. 3.

FIG. 4 shows the example RAID 6 arrangement of FIG. 3 after a single storage device failure, in this case a failure of Storage Device 3. The "affected members" row at the bottom of the figure indicates, for each of the surviving storage devices, a corresponding number of chunklets which are part of one of the affected stripes having chunklets on Storage Device 3. The affected stripes having chunklets on failed Storage Device 3 include stripes A, B, D, E and G. More particularly, failed Storage Device 3 includes data chunklet B1 of stripe B, parity chunklet Dp of stripe D, parity chunklet Aq of stripe A, data chunklet E4 of stripe E, and data chunklet G1 of stripe G. The affected stripes that are impacted by a given storage device failure are also referred to herein as "degraded stripes."

Each of the surviving storage devices has a number of affected members as indicated in the figure, with each such affected member being a chunklet that is part of one of the affected stripes impacted by the failure of Storage Device 3. For example, Storage Device 4 has a total of four such chunklets, namely, chunklets Ap, B2, D1 and Eq. Storage Device 1 has a total of three such chunklets, namely, chunklets D3, Ep and G3. Similarly, each of the other surviving storage devices has at least three affected members.

This means that each of the surviving storage devices in this example has affected members from at least three of the stripes A, B, D, E and G impacted by the failure of Storage Device 3. As a result, if one of the seven surviving storage devices were to fail, the storage system would then be susceptible to data loss upon a failure of another one of the storage devices, that is, upon a third storage device failure, since the subset of stripes which have already been impacted by two failures will not have any redundancy to support rebuild. The failure of the third storage device leading to data loss in this example could be a complete failure (e.g., the storage device can no longer serve reads), or a partial failure (e.g., a read error) that impacts at least one of the stripes that no longer has any redundancy.

Prioritized RAID rebuild is provided responsive to detection of a storage device failure, such as the failure of Storage Device 3 as illustrated in FIG. 4. This illustratively involves selecting one storage device and prioritizing the rebuild of all the stripes which have affected members in the selected storage device. Once the rebuild of these stripes is completed, all the stripes which have membership in this storage device will regain full redundancy (i.e., four data chunklets and two parity chunklets in this example). If the prioritized storage device were to fail after the rebuild of those stripe portions is complete, there would not be any stripe in the storage system which has no redundancy (i.e., has lost two chunklets). Accordingly, if the prioritized storage device were to fail, the storage system 102 will still be resilient to yet another failure.

These embodiments are further configured to avoid overloading the selected storage device with reads for performing the rebuild, which might otherwise result in bottlenecking the rebuild and slowing it down. A slower rebuild will keep the storage system exposed to data loss for a longer time, and is avoided in illustrative embodiments by spreading the rebuild load across all of the remaining storage devices.

In this example, assume that the storage system 102 chooses to prioritize the rebuild of stripes which have affected members in Storage Device 1. As indicated above, the stripes that have affected members in Storage Device 1 are stripes D, E and G, as Storage Device 1 includes chunklets D3, Ep and G3 that are affected members of the stripes A, B, D, E and G impacted by the failure of Storage Device 3.

FIG. 5 is a table showing the sum of affected members per storage device after the storage device failure illustrated in FIG. 4. More particularly, FIG. 5 shows a table of affected chunklets per storage device for the degraded stripes D, E and G that have affected members in Storage Device 1. The stripes D, E and G are the stripes which have members both in Storage Device 3 and in Storage Device 1. In the table, the existence of a member in one of the degraded stripes D, E or G is denoted by a "1" entry. The bottom row of the table sums the total number of affected members for each storage device.

To balance the rebuild load, the storage system 102 will track the amount of work each storage device is performing and try to balance it. On each degraded stripe only four storage devices are required for performing the rebuild so the storage system will leverage this redundancy to perform balanced rebuild. One method for achieving this balance is by way of a "greedy" algorithm which tracks the total amount of work for each storage device and upon rebuilding the next stripe will avoid using the most loaded storage device.

In this example, a balanced distribution of work will result in two storage devices participating in a single rebuild and the rest will participate in two rebuilds.

Once the rebuild of all the degraded stripes D, E and G of Storage Device 1 is complete, the storage system will choose the next storage device to rebuild and continue in the same manner until all of the stripes are rebuilt.

An example prioritized RAID rebuild algorithm in an illustrative embodiment will now be described. The algorithm assumes that the number of stripes is small enough to allow real-time generation of work statistics, illustratively using a work counter vector of the type described below. The metadata of RAID storage systems is usually kept in RAM and therefore real-time generation of these work statistics is feasible. Moreover, the amount of time required for generating work statistics is negligible in comparison to the amount of time required by the rebuild process itself. Certain optimizations in generation of work statistics could be applied depending on the particular type of RAID arrangement being used.

The algorithm in this example operates as follows. Upon detection of a storage device failure in the storage system 102, the algorithm executes the following steps to rebuild all of the degraded stripes:

1. Let W be a work counter vector having a length given by the total number of storage devices of the RAID group and entries representing the accumulated rebuild work of each storage device, and initialize W to all zeros.

2. For each of the surviving storage devices, sum the number of chunklets that are members of degraded stripes, and denote this sum as the "degraded chunklet sum" for the storage device.

3. Select a particular storage device, initially as the storage device having the lowest degraded chunklet sum. If multiple storage devices have the same degraded chunklet sum, randomly select one of those storage devices.

4. While there are degraded stripes which have membership in the selected storage device, select one stripe S and perform the following:
   (a) For the storage devices which have chunklets in stripe S, identify the storage device which to this point has done the maximum amount of work according to the work counter vector W, and drop that storage device from this part of the rebuild process. If all storage devices which have chunklets in stripe S have done the same amount of work, a random one of those storage devices is dropped.
   (b) Increment the entries in the work counter vector W for the rest of the storage devices.
   (c) Rebuild the missing chunklet of the failed storage device using all the storage devices other than the storage device dropped in Step 4(a).

5. Return to Step 4 to repeat for another selected stripe S, until all of the degraded stripes with membership in the selected storage device have been rebuilt, and then move to Step 6.

6. Return to Step 3 to identify another storage device, until all of the degraded stripes have been rebuilt, and then move to Step 7.

7. End rebuild process as the rebuild of all degraded stripes is complete.

An additional instance of the algorithm can be triggered responsive to detection of another storage device failure.

For RAID arrangements with redundancy higher than two, such as n+k RAID arrangements with k>2, multiple storage devices should be dropped from a current rebuild iteration in Step 4(a). The total number of dropped storage devices in a given instance of Step 4(a) should be consistent with the redundancy level supported by of the RAID arrangement, in order to allow rebuild.

A decaying load calculation may be performed in some embodiments to adjust the work counter vector over time. The load on a storage device is in practice very short term. For example, a read operation which was completed at a given point in time has no impact on another read operation taking place one minute later. Therefore, a decay factor α may be applied to the work counter vector W in the following manner:

$$W_{i+1} = \alpha W_i$$

where $0 > \alpha > 1$ and usually α will be relatively close to 1. Other decaying approaches can be used in other embodiments.

The above-described operations associated with prioritized RAID rebuild are presented by way of illustrative example only, and should not be viewed as limiting in any way. Additional or alternative operations can be used in other embodiments.

Again, these and other references to "disks" in the context of RAID herein are intended to be broadly construed, and should not be viewed as being limited to disk-based storage devices. For example, the disks may comprise SSDs, although it is to be appreciated that many other storage device types can be used.

Illustrative embodiments of a storage system with functionality for prioritized RAID rebuild in a storage system as disclosed herein can provide a number of significant advantages relative to conventional arrangements.

For example, some embodiments advantageously enhance storage system resiliency while preserving a balanced rebuild load.

These and other embodiments can facilitate a self-healing process in a storage system in a manner that avoids bottlenecks on particular remaining storage devices and improves storage system performance in the presence of failures. For example, some embodiments can allow the storage system to sustain additional failures even before the self-healing process is fully completed. As a result, storage system resiliency is increased from a statistical analysis perspective.

In illustrative embodiments, undesirable increases in the duration of the self-healing process and the associated adverse storage system performance impacts are advantageously avoided.

These and other substantial improvements are provided in illustrative embodiments without significantly increasing the cost or complexity of the storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for prioritized RAID rebuild in a storage system will now be described in greater detail with reference to FIGS. 6 and 7. Although described in the context of system 100, these platforms may also be used to implement at least portions of other information processing systems in other embodiments.

Figure 6:
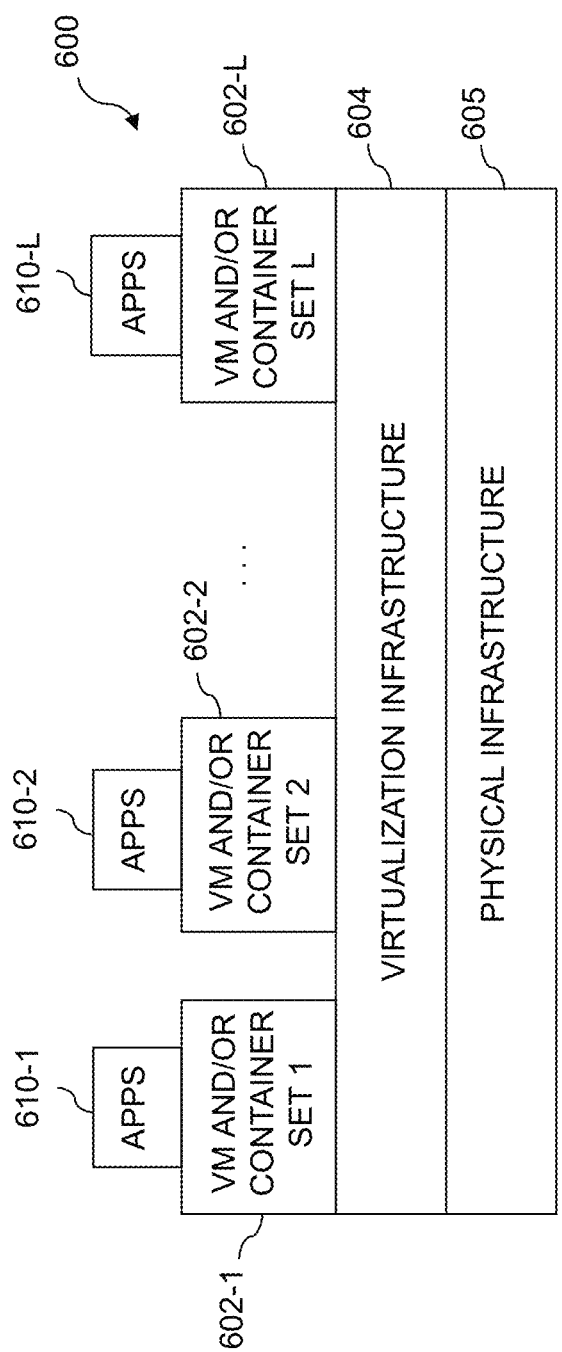
FIGS. 6 and 7 show examples of processing platforms that may be utilized to implement at least a portion of an information processing system in illustrative embodiments.
Figure 7:
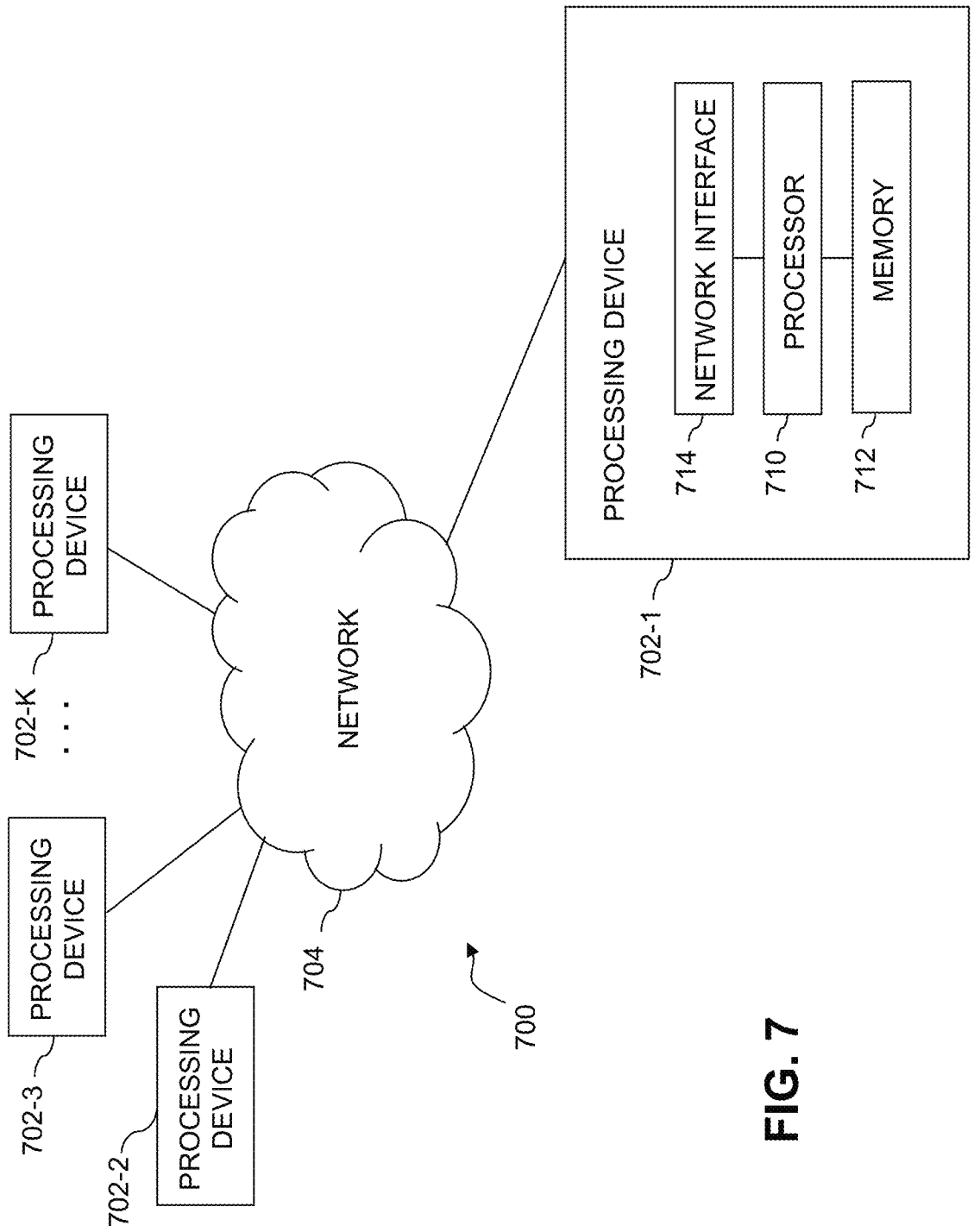

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for prioritized RAID rebuild in a storage system of the type described above using one or more processes running on a given one of the VMs. For example, each of the VMs can implement prioritized rebuild logic instances and/or other components for implementing functionality for prioritized RAID rebuild in the storage system 102.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for prioritized RAID rebuild in a storage system of the type described above. For example, a container host device supporting multiple containers of one or more container sets can implement one or more instances of prioritized rebuild logic and/or other components for implementing functionality for prioritized RAID rebuild in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for prioritized RAID rebuild in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, RAID arrangements, storage controllers, stripe configuration logic, parity computation logic, prioritized rebuild logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
 a storage system comprising a plurality of storage devices;
 the storage system being configured:
 to establish a redundant array of independent disks (RAID) arrangement comprising a plurality of stripes each having multiple portions distributed across multiple ones of the storage devices;
 to detect a failure of at least one of the storage devices;
 responsive to the detected failure, to determine for each of two or more remaining ones of the storage devices a number of stripe portions, stored on that storage device, that are part of stripes impacted by the detected failure; and
 to prioritize a particular one of the remaining storage devices for rebuilding of its stripe portions that are part of the impacted stripes, based at least in part on the determined numbers of stripe portions;
 wherein prioritizing a particular one of the remaining storage devices for rebuilding of its stripe portions that are part of the impacted stripes, based at least in part on the determined numbers of stripe portions, comprises:
 prioritizing a first one of the remaining storage devices having a relatively low determined number of stripe portions for rebuilding of its stripe portions that are part of the impacted stripes, over a second one of the remaining storage devices having a relatively high determined number of stripe portions for rebuilding of its stripe portions that are part of the impacted stripes.

2. The apparatus of claim 1 wherein the RAID arrangement supports at least one recovery option for reconstructing data blocks of at least one of the storage devices responsive to a failure of that storage device.

3. The apparatus of claim 2 wherein the RAID arrangement comprises a RAID 6 arrangement supporting recovery from failure of up to two of the storage devices.

4. The apparatus of claim 1 wherein the stripe portions of each of the stripes comprise a plurality of data blocks and one or more parity blocks.

5. The apparatus of claim 1 wherein prioritizing a particular one of the remaining storage devices for rebuilding of its stripe portions that are part of the impacted stripes, based at least in part on the determined numbers of stripe portions, comprises:
 selecting for rebuilding of its stripe portions that are part of the impacted stripes the particular one of the remaining storage devices that has a lowest determined number of stripe portions relative to the determined numbers of stripe portions of the one or more other remaining storage devices.

6. The apparatus of claim 1 wherein prioritizing a particular one of the remaining storage devices for rebuilding of its stripe portions that are part of the impacted stripes, based at least in part on the determined numbers of stripe portions, comprises:
determining health measures for respective ones of the remaining storage devices; and
taking the determined health measures into account in selecting the particular one of the remaining storage devices for rebuilding of its stripe portions that are part of the impacted stripes.

7. The apparatus of claim 1 wherein the storage system is further configured to balance the rebuilding of the stripe portions of the impacted stripes across the remaining storage devices.

8. The apparatus of claim 7 wherein balancing the rebuilding of the stripe portions of the impacted stripes across the remaining storage devices comprises:
maintaining rebuild work statistics for each of the remaining storage devices over a plurality of iterations of a rebuild process for rebuilding the stripe portions of the impacted stripes; and
selecting different subsets of the remaining storage devices to participate in respective different iterations of the rebuild process based at least in part on the rebuild work statistics.

9. The apparatus of claim 8 wherein maintaining rebuild work statistics comprises maintaining a work counter vector that stores counts of respective rebuild work instances for respective ones of the remaining storage devices and wherein a decay factor is applied to the work counter vector in conjunction with one or more of the iterations.

10. The apparatus of claim 7 wherein balancing the rebuilding of the stripe portions of the impacted stripes across the remaining storage devices comprises:
tracking amounts of rebuild work performed by respective ones of the remaining storage devices in rebuilding the stripe portions of a first one of the impacted stripes; and
excluding at least one of the remaining storage devices from performance of rebuild work for another one of the impacted stripes based at least in part on the tracked amounts of rebuild work for the first impacted stripe;
wherein said at least one excluded remaining storage device for the other one of the impacted stripes comprises the remaining storage device that performed a largest amount of rebuild work of the amounts of rebuild work performed by respective ones of the remaining storage devices for the first impacted stripe.

11. An apparatus comprising:
a storage system comprising a plurality of storage devices;
the storage system being configured:
to establish a redundant array of independent disks (RAID) arrangement comprising a plurality of stripes each having multiple portions distributed across multiple ones of the storage devices;
to detect a failure of at least one of the storage devices;
responsive to the detected failure, to determine for each of two or more remaining ones of the storage devices a number of stripe portions, stored on that storage device, that are part of stripes impacted by the detected failure; and
to prioritize a particular one of the remaining storage devices for rebuilding of its stripe portions that are part of the impacted stripes, based at least in part on the determined numbers of stripe portions;
wherein determining for one of the remaining storage devices the number of stripe portions, stored on that storage device, that are part of the impacted stripes comprises:
determining a number of data blocks stored on that storage device that are part of the impacted stripes;
determining a number of parity blocks stored on that storage device that are part of the impacted stripes; and
summing the determined number of data blocks and the determined number of parity blocks to obtain the determined number of stripe portions for that storage device.

12. An apparatus comprising:
a storage system comprising a plurality of storage devices;
the storage system being configured:
to establish a redundant array of independent disks (RAID) arrangement comprising a plurality of stripes each having multiple portions distributed across multiple ones of the storage devices;
to detect a failure of at least one of the storage devices;
responsive to the detected failure, to determine for each of two or more remaining ones of the storage devices a number of stripe portions, stored on that storage device, that are part of stripes impacted by the detected failure; and
to prioritize a particular one of the remaining storage devices for rebuilding of its stripe portions that are part of the impacted stripes, based at least in part on the determined numbers of stripe portions;
wherein the storage system is further configured:
to rebuild, for the particular prioritized one of the remaining storage devices, its stripe portions that are part of the impacted stripes;
to select another one of the remaining storage devices for rebuild prioritization; and
to rebuild, for the selected other one of the remaining storage devices, its stripe portions that are part of the impacted stripes.

13. The apparatus of claim 12 wherein the selecting of another one of the remaining storage devices for rebuild prioritization and the rebuilding, for the selected other one of the remaining storage devices, its stripe portions that are part of the impacted stripes, are repeated for one or more additional ones of the remaining storage devices until all of the stripe portions of the impacted stripes are fully rebuilt.

14. A method for use in a storage system comprising a plurality of storage devices, the method comprising:
establishing a redundant array of independent disks (RAID) arrangement comprising a plurality of stripes each having multiple portions distributed across multiple ones of the storage devices;
detecting a failure of at least one of the storage devices;
responsive to the detected failure, determining for each of two or more remaining ones of the storage devices a number of stripe portions, stored on that storage device, that are part of stripes impacted by the detected failure; and
prioritizing a particular one of the remaining storage devices for rebuilding of its stripe portions that are part of the impacted stripes, based at least in part on the determined numbers of stripe portions;

wherein prioritizing a particular one of the remaining storage devices for rebuilding of its stripe portions that are part of the impacted stripes, based at least in part on the determined numbers of stripe portions, comprises:
prioritizing a first one of the remaining storage devices having a relatively low determined number of stripe portions for rebuilding of its stripe portions that are part of the impacted stripes, over a second one of the remaining storage devices having a relatively high determined number of stripe portions for rebuilding of its stripe portions that are part of the impacted stripes.

15. The method of claim 14 wherein prioritizing a particular one of the remaining storage devices for rebuilding of its stripe portions that are part of the impacted stripes, based at least in part on the determined numbers of stripe portions, comprises:
selecting for rebuilding of its stripe portions that are part of the impacted stripes the particular one of the remaining storage devices that has a lowest determined number of stripe portions relative to the determined numbers of stripe portions of the one or more other remaining storage devices.

16. The method of claim 14 further comprising balancing the rebuilding of the stripe portions of the impacted stripes across the remaining storage devices.

17. A computer program product comprising a non-transitory processor-readable storage medium having stored therein program code of one or more software programs, wherein the program code when executed by a processor of a storage system comprising a plurality of storage devices, causes the storage system:
to establish a redundant array of independent disks (RAID) arrangement comprising a plurality of stripes each having multiple portions distributed across multiple ones of the storage devices;
to detect a failure of at least one of the storage devices;
responsive to the detected failure, to determine for each of two or more remaining ones of the storage devices a number of stripe portions, stored on that storage device, that are part of stripes impacted by the detected failure; and
to prioritize a particular one of the remaining storage devices for rebuilding of its stripe portions that are part of the impacted stripes, based at least in part on the determined numbers of stripe portions;
wherein prioritizing a particular one of the remaining storage devices for rebuilding of its stripe portions that are part of the impacted stripes, based at least in part on the determined numbers of stripe portions, comprises:
prioritizing a first one of the remaining storage devices having a relatively low determined number of stripe portions for rebuilding of its stripe portions that are part of the impacted stripes, over a second one of the remaining storage devices having a relatively high determined number of stripe portions for rebuilding of its stripe portions that are part of the impacted stripes.

18. The computer program product of claim 17 wherein prioritizing a particular one of the remaining storage devices for rebuilding of its stripe portions that are part of the impacted stripes, based at least in part on the determined numbers of stripe portions, comprises:
selecting for rebuilding of its stripe portions that are part of the impacted stripes the particular one of the remaining storage devices that has a lowest determined number of stripe portions relative to the determined numbers of stripe portions of the one or more other remaining storage devices.

19. The computer program product of claim 17 wherein the program code when executed by the processor of the storage system further causes the storage system to balance the rebuilding of the stripe portions of the impacted stripes across the remaining storage devices.

20. The computer program product of claim 17 wherein balancing the rebuilding of the stripe portions of the impacted stripes across the remaining storage devices comprises:
maintaining rebuild work statistics for each of the remaining storage devices over a plurality of iterations of a rebuild process for rebuilding the stripe portions of the impacted stripes; and
selecting different subsets of the remaining storage devices to participate in respective different iterations of the rebuild process based at least in part on the rebuild work statistics.

\* \* \* \* \*